United States Patent
Benderly

(10) Patent No.: US 6,660,964 B1
(45) Date of Patent: Dec. 9, 2003

(54) OPTICAL MODIFICATION OF LASER BEAM CROSS SECTION IN OBJECT MARKING SYSTEMS

(76) Inventor: David Benderly, 575 Main St., New York, NY (US) 10044

( * ) Notice: Subject to any disclaimer, the term of this patent is extended or adjusted under 35 U.S.C. 154(b) by 0 days.

(21) Appl. No.: 09/668,197

(22) Filed: Sep. 22, 2000

(51) Int. Cl.[7] .............................................. B23K 26/40
(52) U.S. Cl. ........................... 219/121.74; 219/121.68
(58) Field of Search ........................ 219/121.74, 121.68, 219/121.69

(56) References Cited

U.S. PATENT DOCUMENTS

| | | | | |
|---|---|---|---|---|
| 4,467,172 A | * | 8/1984 | Ehrenwald et al. | |
| 4,734,558 A | * | 3/1988 | Nakano et al. | |
| 5,410,125 A | * | 4/1995 | Winston et al. | 219/121.69 |
| 5,463,200 A | * | 10/1995 | James et al. | 219/121.68 |
| 5,483,038 A | * | 1/1996 | Ota et al. | 219/121.69 |
| 5,624,437 A | * | 4/1997 | Freeman et al. | |
| 5,747,772 A | * | 5/1998 | Matsumura et al. | 219/121.69 |
| 5,932,119 A | * | 8/1999 | Kaplan et al. | |
| 6,037,564 A | * | 3/2000 | Tatah | 219/121.74 |
| 6,144,011 A | * | 11/2000 | Moss et al. | 219/121.68 |
| 2002/0008091 A1 | * | 1/2002 | Brandinger et al. | 219/121.67 |

FOREIGN PATENT DOCUMENTS

JP 3-257939 A * 11/1991
JP 9-206965 * 8/1997

* cited by examiner

Primary Examiner—Geoffrey S. Evans
(74) Attorney, Agent, or Firm—Kirschstein, et al.

(57) ABSTRACT

Cells of a liquid crystal device are switched between transparent and dark states or, alternatively, reflectors of a microelectromechanical system are switched between tilted states, to form a marking pattern and control the transmission of a laser beam to an object to be marked.

1 Claim, 1 Drawing Sheet

OPTICAL MODIFICATION OF LASER BEAM CROSS SECTION IN OBJECT MARKING SYSTEMS

BACKGROUND OF THE INVENTION

1. Field of the Invention

The present invention generally relates to laser marking of objects and, more particularly, to a rapid marking of the objects and to a rapid changeover between marks of successive objects.

2. Description of the Related Art

Lasers have been used to mark a great variety of objects and materials, for example, diamonds and other hard materials, as described, for example, in U.S. Pat. No. 4,392,476 and U.S. Pat. No. 4,467,172 where relative movement between a laser beam and a diamond surface is performed, and in U.S. Pat. No. 5,149,938, U.S. Pat. No. 5,410,125 and U.S. Pat. No. 5,573,684 where a mask, which is preformed with a cutout that defines a marking, is positioned between a laser and an object to be marked. Lasers have also been used to mark electrical wires, medical parts, consumer products, automotive parts, and, generally speaking, anything requiring to be identified and tracked.

The relative movement between the laser beam and the object is typically performed under computer control and takes a finite, but non-negligible, time to complete. Many objects are marked when mounted in succession on a moving conveyor belt. The conveyor belt cannot be stopped or paused to permit marking to occur. Even if an object is not on a moving conveyor belt, but is held stationary in a fixture, there are times when the amount of information to be marked takes a considerable time to perform, for example, when marking a two-dimensional bar code symbol such as Data Matrix(trademark), or a bit-mapped image or logo.

In the case where a mask is used with a preformed cutout, one mask can only produce a single marking. All objects are therefore marked with the same marking. To change the marking, one must physically substitute another mask with a different preformed cutout. This is not a practical solution where a multitude of objects is to be differently marked, for example, by incremental numerical markings, since it would require the manufacture and substitution of a corresponding multitude of masks, all involving a considerable time to perform.

SUMMARY OF THE INVENTION

Objects of the Invention

Accordingly, it is a general object of this invention to rapidly mark an object.

More particularly, it is an object of the present invention to rapidly change markings on successive objects to be marked.

Still another object of the present invention is to mark objects in a time-efficient manner.

It is yet another object of the present invention to mark objects with a great amount of information without incurring long marking times.

Features of the Invention

In keeping with the above objects and others which will become apparent hereafter, one feature of the present invention resides in an arrangement for, and a method of, marking an object. The object can be virtually anything requiring to be identified. The invention comprises a source, such as a laser, for emitting a laser beam having a cross section along a path toward the object at a power level sufficient to mark the object, an optical modifier in the path for optically modifying the cross section of the beam incident on the modifier, including a plurality of optical modifying elements each having an optical property and being switchable between optical states to vary the optical property, and a controller for switching at least one of the elements to at least one of the states to change the cross section of the beam leaving the modifier.

In one preferred embodiment, the modifier is a liquid crystal device, and each of the elements is a liquid crystal cell containing a liquid switchable upon application of an electrical, or magnetic, or electromagnetic, external field between a light-transmissive state in which the beam passes through a respective element, and an opaque state in which the beam is prevented from passing through, or is blocked by, the respective element. The controller selects the state of each of the cells. The desired marking is formed by switching selected ones of the cells to the light-transmissive state so that the light beam passes through the light-transmissive cells, and is blocked by the opaque cells. The light-transmissive cells define the shape of the marking.

In another preferred embodiment, the modifier is a microelectromechanical system (MEMS), and each of the elements is a reflector or a micromirror tiltable upon application of an electrical, or magnetic, or electromagnetic, external field between a first state in which the beam impinging on a respective reflector is directed along the path, and a second state in which the impinging beam is directed away from the path. The desired marking is formed by switching selected ones of the reflectors to the first state so that these selected reflectors define the shape of the marking.

Once the selected elements have been switched to the light-transmissive or the first states, a single output pulse of the laser is sufficient to mark the object. This pulse lasts on the order of femtoseconds to several seconds as opposed to the prior art techniques of conducting relative movement between a laser beam and an object which can take minutes, in some cases, or of replacing masks which can likewise take many minutes to perform. The switching of the selected elements also is conducted in fractions of a second, or in seconds.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
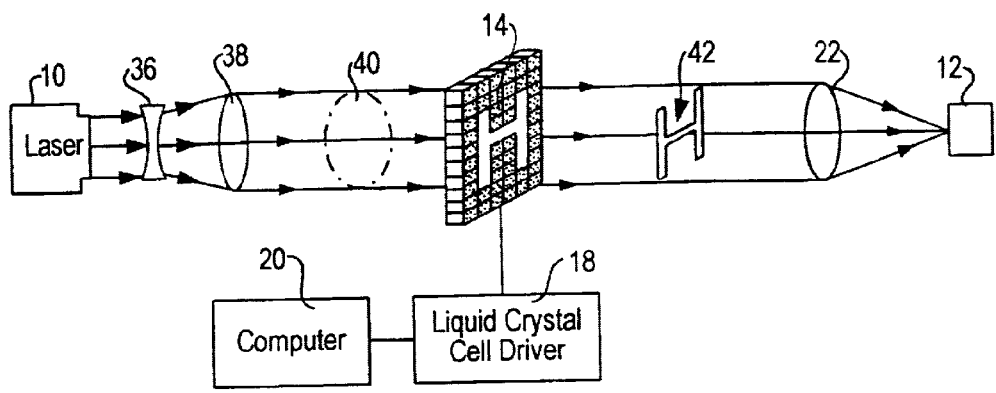
FIG. 1 is a diagrammatic view of one embodiment in accordance with the invention.

Referring to FIG. 1, reference numeral 10 generally identifies a laser, in this case, a YAG or Nd:YAG laser operating at 1.06 microns wavelength, operative for emitting a laser beam having a cross section along a path toward an object 12 at a power or energy level sufficient to mark the object, typically by penetrating the surface of the object and by heating and vaporizing irradiated portions thereof.

Figure 2:
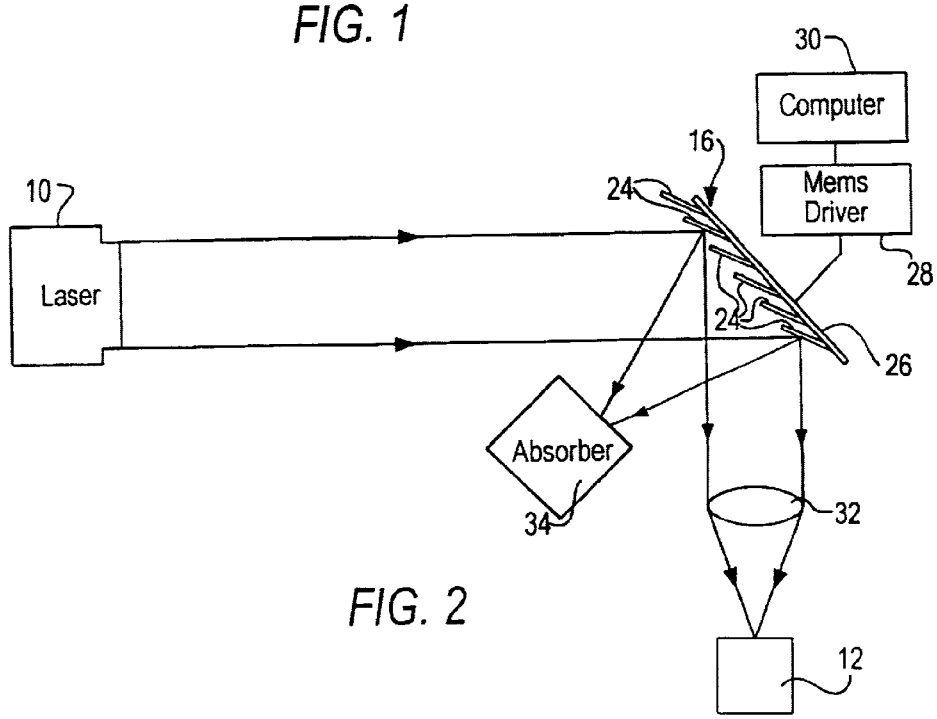
FIG. 2 is a diagrammatic view of another embodiment in accordance with the invention.

However, this invention is not intended to be limited to YAG lasers, since other lasers, such as an excimer laser, is preferably used in the embodiment of FIG. 2. The excimer laser is a pulsed gas-discharge laser in which a gas mixture (for example, argon and fluorine) is charged to produce one or more pulses at wavelengths from 0.157–0.351 microns depending on the particular rare gas halide used. Argon fluorine excimers produce laser energy at 0.193 microns so that the depth of penetration into the object is minimal. Also contemplated is the use of solid-state, harmonically-converted, ultraviolet lasers, as well as other sources of electromagnetic radiation.

Moreover, this invention is not intended to be limited to marking diamonds since virtually any object can be marked and identified according to this invention. For example, electrical wires are required to be marked incrementally, numerically and/or alphabetically, for many wiring applications. These markings are often marked in series numbering in the thousands, millions, and higher. This invention has particular benefit to objects, such as wires, successively arranged along a production line, for example, on a conveyor, to be marked, as well as to medical parts, consumer products, automotive parts, and, generally speaking, anything requiring to be identified and tracked.

As shown in FIG. 1, the cross section 40 of the beam is generally circular when it exits the laser 10 and has been expanded by beam expander lens 36 and focused by focusing lens 38. This invention changes the cross section 40 before the beam impinges on the object 12. According to this invention, an optical modifier is located in the path between the laser and the object. In FIG. 1, the modifier is a liquid crystal device (LCD) 14. In FIG. 2, the modifier is a microelectromechanical system (MEMS) 16. The modifier is operative for optically modifying the beam cross section incident on the modifier. In each embodiment, the modifier includes a plurality of optical modifying elements each having an optical property and being switchable between optical states to vary the optical property. Preferably, the plurality of elements is arranged in an array in a plane along mutually orthogonal rows and columns.

The LCD 14 includes a plurality of liquid crystal cells having a liquid whose molecules are oriented in different ways upon application of an external electrical, or magnetic, or electromagnetic, field. Each cell is switchable between a light-transmissive state in which the beam incident on the cell passes therethrough, and an opaque state in which the beam incident on the cell is prevented from passing through and is blocked. Each cell is thus switchable between a transparent or light state and an opaque or dark state. Depending on the wavelength of the incident laser and the liquid utilized in each cell, the laser may be reflected or absorbed in the opaque state. The optical property changed during switching of each cell is light transmittance.

In a currently preferred embodiment, the longest dimension of the beam cross section is about 3 mm, and the array is about 100×100 cells. Each cell is driven by a driver 18 under control of a computer 20.

In dependence upon user input, the computer selects which of the cells to switch to the transparent state, the other non-selected cells being switched to the opaque state. The selected transparent cells define the marking to be applied to the object. As shown in FIG. 1, the transparent cells form the letter "H". The beam cross section 42 leaving the LCD 14 thus has an H-shaped cross section, as shown in FIG. 1, which is then focused by a focusing lens 22 onto the object 12 to be marked with the letter "H".

The MEMS 16 of FIG. 2 includes a plurality of tiny, tilting micromirrors 24 or reflectors also arranged in an array of mutually orthogonal rows and columns. Each reflector is preferably circular and several hundred micrometers in diameter. Some two hundred, fifty-six of these reflectors can fit on a few square millimeters of a silicon substrate 26. Each reflector is tiltable upon application of a mechanical force, or an external electrical, or magnetic, or electromagnetic field by a MEMS driver 28 under control of a computer 30.

In one tilted position, each reflector is moved to a first reflected state in which the beam incident on the respective reflector is reflected therefrom and directed along the path toward a focusing lens 32 and the object 12. In another tilted position, each reflector is moved to a second reflected state in which the incident beam is reflected therefrom away from the path in another direction, for example, to a light absorber 34. The optical property changed during switching of each reflector is light reflectance along a particular direction.

In dependence upon user input, the computer 30 selects which of the reflectors to switch to the first state (along the path), the other non-selected reflectors being switched to the second state (away from the path). The selected reflectors define the marking to be applied to the object.

For each embodiment, the switching of the selected elements (cells or reflectors) takes place in a range from femtoseconds to several seconds. The laser has a pulsed output, and a pulse lasts from femtoseconds to several seconds. The marking of the object thus is performed in a very minimal amount of time, thereby enabling this technique to be performed on successive objects on a moving conveyor without having to stop or pause the conveyor. Marking on stationary objects is, of course, more rapidly done than heretofore. No longer need multiple masks be made and substituted for other masks since the modifier 14, 16 stays in place while its various elements are electronically, electromagnetically, or mechanically switched as desired.

It will be understood that each of the elements described above, or two or more together, also may find a useful application in other types of constructions differing from the types described above.

While the invention has been illustrated and described as embodied in an optical modification of a laser beam cross section in object marking systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims

I claim:

1. An arrangement for rapidly marking successive gemstones with different markings, comprising:

a) an excimer laser for emitting a pulsed laser beam at wavelengths in a range from under 0.190 microns to 0.157 microns along a path to each gemstone and at a power level sufficient to vaporize selected material from the respective gemstone;

b) a microelectromechanical system (MEMS) including a plurality of tiltable reflectors in the path of the laser beam, the reflectors being arranged in an array along mutually orthogonal rows and columns; and c) an electrically switchable controller for tilting a first group of the reflectors to a first tilted position in which the laser beam is reflected off said first group of the reflectors to one of the gemstones to vaporize the selected material therefrom and mark said one gemstone with a first marking, and for tilting a second group of the reflectors to a second tilted position in which the laser beam is reflected off said second group of the reflectors to another of the gemstones to vaporize the selected material therefrom and mark said other gemstone with a second marking, said controller being electrically switchable between said groups of the reflectors at a rate from femtoseconds to seconds.

* * * * *